March 9, 1926. 1,576,121
J. J. PREBLE
FILTER UNIT
Filed April 30, 1925   2 Sheets-Sheet 1
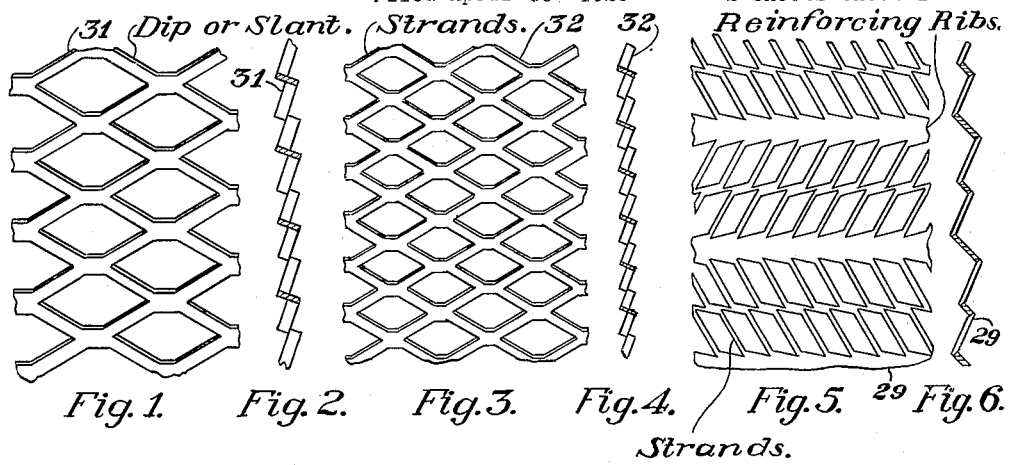
Fig. 1.   Fig. 2.   Fig. 3.   Fig. 4.   Fig. 5.   Fig. 6.
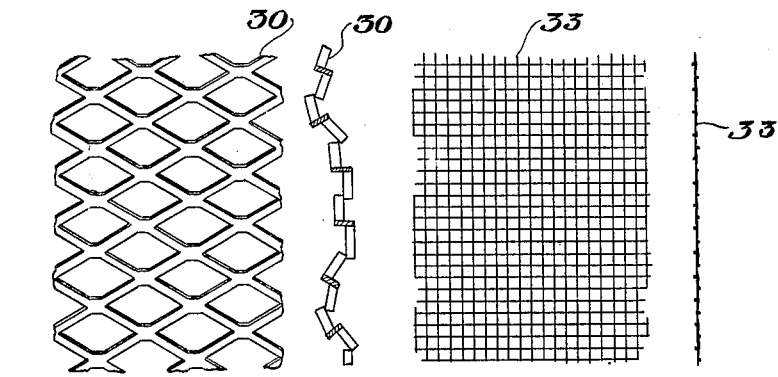
Fig. 7.   Fig. 8.   Fig. 9.   Fig. 10.
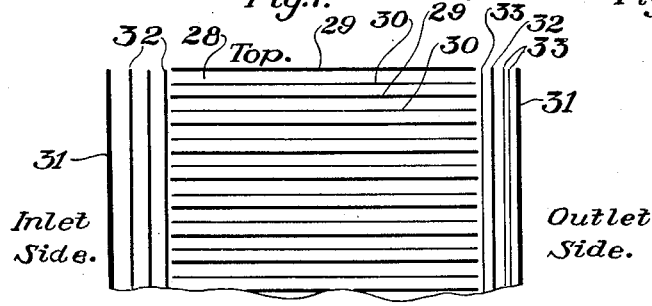
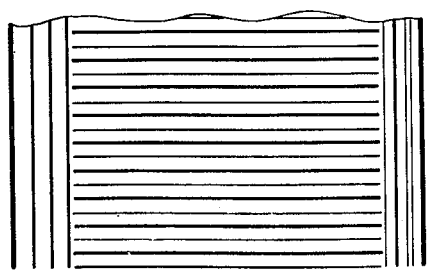
Fig. 11.
Inventor
James Jarvis Preble
by Charles W. McDermott
his attorney March 9, 1926.  1,576,121
J. J. PREBLE
FILTER UNIT
Filed April 30, 1925    2 Sheets-Sheet 2

Inventor
James Jarvis Preble
by Charles W. McDermott
his attorney

Patented Mar. 9, 1926.

1,576,121

UNITED STATES PATENT OFFICE.

JAMES JARVIS PREBLE, OF NEWTON, MASSACHUSETTS, ASSIGNOR TO SPRAY ENGINEERING COMPANY, OF BOSTON, MASSACHUSETTS, A CORPORATION OF MASSACHUSETTS.

FILTER UNIT.

Application filed April 30, 1925. Serial No. 27,033.

*To all whom it may concern:*

Be it known that I, JAMES JARVIS PREBLE, a citizen of the United States, residing at Newton, in the county of Middlesex and Commonwealth of Massachusetts, have invented certain Improvements in Filter Units, of which the following description, in connection with the accompanying drawings, is a specification, like reference characters on the drawings indicating like parts in the several figures.

The present invention relates to the art of eliminating or recovering the small, solid particles called dust, floating in a gas, such as atmospheric air, or a gas produced in a manufacturing process. These small, solid particles are injurious to humanity, through the contamination of the air breathed or the food products consumed; to industry, through the accumulation of dust on surfaces, machinery, and products, the deteriorating action of grit on moving parts, and the production of explosive mixtures, and to society, through the escape of noxious or vegetable destroying materials from manufacturing plants. In many industries, however, the small particles floating in the gas are valuable and their recovery is important.

Innumerable materials have been used heretofore for the elimination or recovery of the injurious or valuable dust. For the most part these materials are combustible or are otherwise disadvantageous because they quickly clog or are hard to clean. Two types of all-metal filter units have been developed which are non-combustible and which give satisfactory service. These two types are expensive to make and thus have a high initial cost. In one type, the filtering media comprises split wire or mineral wool which, after being assembled in the filter cell, is passed through a special process in which each fibre of the filtering media receives a protective non-corrosive coating which binds it to every other fibre it touches, thus forming a permanent and porous metallic mass. This mass is then given a heavy coat of black enamel and baked. The baked enamel mass is then coated with a viscous fluid having a strong affinity for dust. In the other type of all-metal filter the filtering media comprises a mass of viscous coated metallic pieces of geometric form such as spheres, cylinders, both solid and hollow, prisms and concavo-convexo rods. All of these shapes cost something to form.

The object of the present invention is to provide a filter unit with a filtering media of simplified and improved construction whereby a great saving is made in the cost of manufacture and whereby a highly efficient filter is obtained.

To the accomplishment of this object, a feature of the invention contemplates the provision in a filter unit cell having inlet and outlet openings for the passage of a gas therethrough, of a stack of densely compacted diversiform foraminous viscous-coated sheets arranged within the cell with the end faces on one side of the stack directed towards the inlet opening. By a stack is meant a series of sheets either upended or piled one on top of the other. With this construction the incoming air impinges against the end faces of the diversiform foraminous sheets in the stack which forcibly splits the air into a multiplicity of sub-currents. These currents wind back and forth or meander in a zig-zag or undulating manner through the openings in the sheets and between the sheets in lines angular to the plane of the sheets. The dust particles thus are thrown from the air by sudden and repeated changes in its direction. The eliminated dust is collected and retained on the sticky surfaces of the sheets.

In the broader aspects of the invention the foraminous sheets may be metal or wire mesh screens. It is better, however, to use sheets of expanded metal as they are very cheap owing to the enormous quantities produced for plaster bonding and concrete reinforcing and other building purposes, and best to employ an alternate series of corrugated and double-mesh herringbone expanded metal sheets because of the large number of strands thereof which are bent in all directions thus exposing an enormous aggregate area of sticky surface to the air passing through the filter.

Broadly considered the expanded metal sheets may fill completely the space between the inlet and outlet openings in the cell. It is preferred, however, to interpose between the inlet opening and the stack a laminated heavy dust accumulator in order to relieve the stack of the duty of eliminating heavy dust particles and so reduce its liability to clog. Furthermore, it is advantageous to interpose between the outlet opening and the stack a laminated light dust accumulator in order to eliminate exceedingly fine particles of dust which are not caught in the stack or to catch any fine particles of dust which may have been eliminated and retained on the stack but which may have been blown off the stack. These laminated heavy and light dust accumulators interposed between the stack and the inlet and outlet openings, respectively, may also be the covers for the openings.

Other features of the invention relate to certain devices, combinations and arrangements of parts fully set forth hereinafter, the advantages of which will be readily understood by those skilled in the art.

The various features of the invention will be best understood from an inspection of the accompanying drawings illustrating one embodiment of the invention, in which, Figure 1 is a detail plan of a coarse expanded metal sheet;

Fig. 2 is a vertical sectional elevation thereof;

Fig. 3 is a detail plan of a finer expanded metal sheet;

Fig. 4 is a vertical sectional elevation thereof;

Fig. 5 is a detail plan of a double-mesh herringbone expanded metal sheet;

Fig. 6 is a vertical sectional elevation thereof;

Fig. 7 is a detail plan of a corrugated expanded metal sheet;

Fig. 8 is a vertical sectional elevation thereof;

Fig. 9 is a detail plan of a fine wire screen;

Fig. 10 is a vertical sectional elevation thereof;

Fig. 11 is a diagrammatic right side elevation showing the arrangement of the parts comprising the filtering media;

It will be apparent to those skilled in the art that no drawing could adequately illustrate the filtering media of the present invention. For the purpose of disclosure it is considered sufficient to illustrate the kind of expanded metal sheets and fine wire screens comprising the filtering media and the heavy and light dust accumulators and then to illustrate in a diagrammatic manner how these sheets are assembled to form the complete contents of the filter cell.

Figure 12:
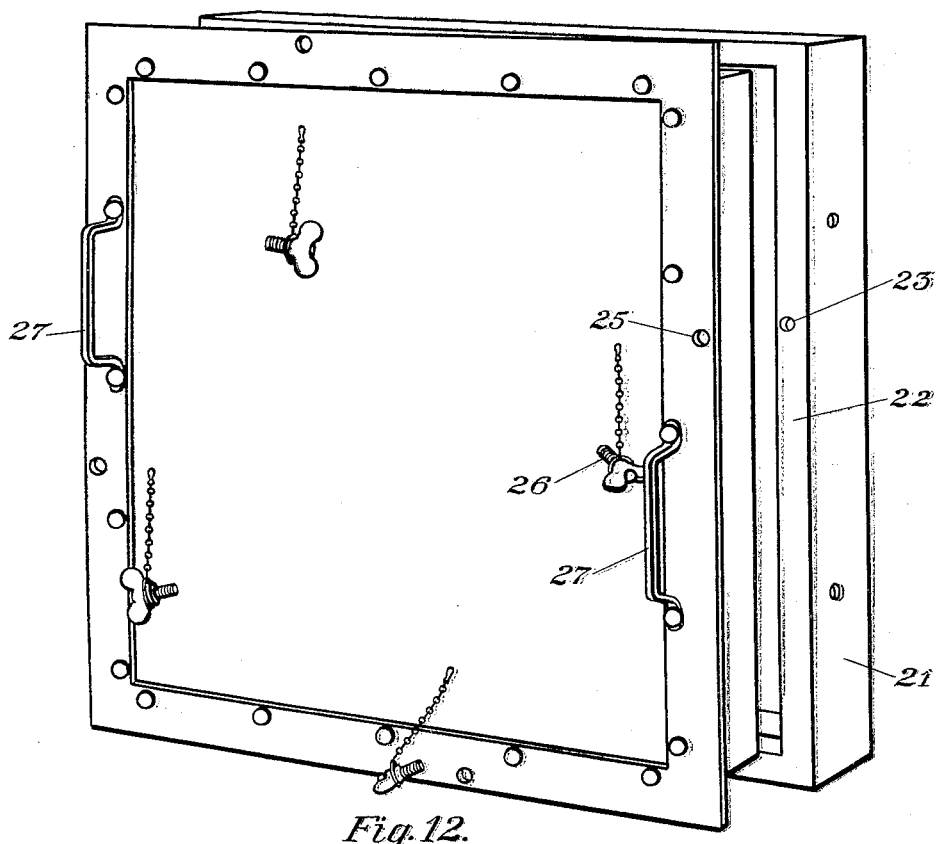
Fig. 12 is a detail in perspective showing the filter unit cell and the frame therefor.
Figure 13:
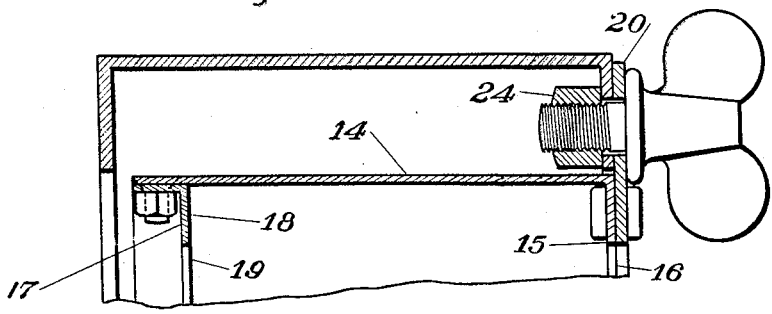
Fig. 13 is a sectional detail showing the means for securing the filter unit cell to the frame.

Referring first to Figs. 12 and 13 the filter unit cell comprises a heavy gauge steel box 14 having an inturned flange 15 providing an inlet opening 16. Bolted within the open rear end of the box 14 is a removable back 17 having an inturned flange 18 providing an outlet opening 19. The box carries a rectangular flange 20 the inner edges of which are flush with the edges of the inlet opening 16 and the outer edges of which project beyond the sides of the box 14. The filter unit cell is secured to a frame 21 shaped to receive the box 14 and to engage with the flange 20. A flange or face 22 on the frame 21 is provided with four openings 23 each of which registers with a nut 24 (Fig. 13) welded to the inside surface of the flange 22. When the box 14 is inserted within the frame 21 with the flange 20 on the box engaged with the flange 22 four holes 25 on the flange 20 register with the holes 23. The filter media (not shown) within the filter cell carries four screw-threaded wing bolts 26 which may be inserted through the holes 25 and 23 and threaded into the nuts 24 to make an airtight joint between the flanges 20 and 22. When the wing bolts 26 are withdrawn the filter cell is removed by engaging the handles 27 secured to the flange 20.

The main filtering media within the filter cell comprises a stack 28 (Fig. 11) of viscous-coated diversiform expanded metal sheets each of which is arranged in a plane normal to the inlet opening 16. Stated in another way, the end faces of the sheets on one side of the stack 28 are directed toward the inlet opening. While the number of sheets in the stack 28 may vary to meet varying operating conditions it has been found that with a stack composed of 160 sheets (18"x2.4") excellent results are obtained.

Preferably the stack 28 is composed of 80 double-mesh herringbone expanded metal sheets 29 (Figs. 5 and 6) and 80 corrugated expanded metal sheets 30 (Figs. 7 and 8) alternately arranged throughout the stack. Referring to Figs. 5, 6, 7 and 8 it will be apparent that the various strands of the double-mesh herringbone and corrugated sheets are bent in many directions. The air in passing through the stack from one end face to the opposite end face thereof has its direction suddenly and repeatedly changed by these strands. The air in addition to encountering the strands passes in a zig-zag or undulating manner through the openings in the sheets from one face thereof to the opposite face. The air is thus exposed to an enormous aggregate area of sticky surface which removes practically all the dust from the air.

The stack 28 may take up the entire space between the inlet and outlet openings in the filter cell. It is preferred, however, to interpose between the stack and the inlet opening 16 a heavy dust accumulator comprising a series of four viscous-coated expanded metal sheets arranged in planes parallel to the plane of the inlet opening. This heavy dust accumulator, which also may be termed a laminated cover for the inlet opening 16, removes the larger particles of dust from the air thus relieving the stack of this duty and accordingly reducing the liability of the stack to clog. The first sheet of the heavy dust accumulator is a sheet of coarse expanded metal 31 (Figs. 1 and 2) arranged against the internal face of the flange 15 with the long way of the mesh running substantially vertical. The next sheet is a sheet of finer expanded metal 32 (Figs. 3 and 4) arranged with the long way of the mesh running substantially horizontal. The next two sheets are the sheets 32 arranged with the long way of the mesh running substantially vertical and horizontal, respectively.

Interposed between the stack 28 and the outlet opening 19 is a light dust accumulator comprising a series of five viscous-coated sheets, one of which is the sheet 32, another the sheet 31, and the other three of which are the fine wire screens 33 (Figs. 9 and 10). The coarse expanded sheet 31 is arranged against the flange 18. Next to the sheet 31 comes two wire screens 33, then the sheet 32, and then interposed between the stack 28 and the sheet 32, a wire screen 33. This light dust accumulator, which also may be termed a laminated cover for the outlet opening 19, removes any fine particles of dust which may have passed through the stack or which, having been eliminated by the stack, work loose and are blown off the stack by the air passing therethrough.

Referring to Fig. 11 the dust-laden air enters the filter cell through the inlet opening and passes through the openings in the heavy dust accumulator which eliminates or recovers the heavier particles of dust. The air next impinges against the end faces of the stack 28 which forcibly splits the air into a large number of sub-currents which find their way through the stack being turned suddenly in a number of different directions by the strands of the expanded metal sheets. Most of the remaining particles of dust are eliminated or recovered in the stack. After leaving the stack the air passes through the light dust accumulator which eliminates or recovers practically all the dust remaining in the air.

In filling a unit cell with the filtering media the back 18 of the box 14 is removed. The coarse sheet 31 is then inserted within the box and placed against the flange 15. The sheet 31 is then backed by the three sheets 32. The stack 28 is built up outside the box, the sheets comprising the stack being clamped or bound in place to facilitate insertion of the stack within the box and against the last sheet 32. After insertion within the box 14 the clamp or binder for the stack is removed and the light dust collector or laminated cover for the opening is inserted into the box. First a wire screen 33 is inserted against the stack 28. Next a sheet of expanded metal 32 is inserted within the box. Then two sheets of wire screen 33. Thereafter the coarse sheet of expanded metal 31 is inserted. Finally the back is pushed against the sheet 31 and bolted in place to the box 14. The filter cell is then dipped into a tank containing a viscous fluid having a strong affinity for dust in order to coat all the surfaces of the filtering media with means for retaining the dust thrown from the air by the sudden and repeated changes in the direction thereof caused by the construction and arrangement of the filtering media.

It will be apparent to those skilled in the art that expanded metal sheets constitute not only an exceedingly cheap filtering media, but a most efficient one as well. In fact, experiments have demonstrated that by the use of expanded metal sheets more dust eliminating and retaining surfaces are exposed in a given space to the air than in any filter heretofore proposed.

Nothing herein explained is to be interpreted as limiting the invention in the scope of its application to use in connection with the particular apparatus or the particular mode of operation or both selected for purposes of illustration and explanation. While the particulars of construction herein set forth are well suited to one mechanical form of the invention, it is not limited to these details of construction, nor to the conjoint use of all its features, nor is it to be understood that these particulars are essential since they may be variously modified within the skill of the artisan without departing from the true scope of the actual invention, characterizing features of which are set forth in the following claims by the intentional use of generic terms and expressions inclusive of various modifications.

What is claimed as new, is:

1. A filter unit having, in combination, a cell having inlet and outlet openings, and a densely compacted stack of diversiform expanded metal sheets interposed between the openings.

2. A filter unit having, in combination, a cell having inlet and outlet openings, a foraminous metal cover for each opening, and a densely compacted stack of diversiform expanded metal sheets interposed between the covers.

3. A filter unit having, in combination, a cell having inlet and outlet openings, a foraminous metal cover for each opening, and a stack of densely compacted filtering means interposed between the covers comprising an alternate series of corrugated and double-mesh herringbone expanded metal sheets.

4. A filter unit having, in combination, a cell having inlet and outlet openings, a foraminous metal cover for each opening, and a stack of densely compacted diversiform foraminous metal sheets arranged normal to said openings interposed between the covers.

5. A filter unit having, in combination, a cell having inlet and outlet openings, and a metal cover for the inlet opening comprising a stack of foraminous metal sheets arranged parallel to the said inlet opening with the long way of the mesh thereof alternating successively.

6. A filter unit having, in combination, a cell having inlet and outlet openings, and a laminated metal cover for the outlet opening comprising a coarse expanded metal sheet over the outlet opening, a pair of screens next to the coarse sheet of expanded metal, a finer sheet of expanded metal next to the pair of screens, and a third screen next to the finer sheet of expanded metal.

7. A filter unit having, in combination, a cell having inlet and outlet openings for the passage of a gas therethrough, a stack of expanded metal sheets arranged within the cell with the end faces on one side of the stack directed towards the inlet opening, and a heavy and a light dust laminated accumulator interposed between the stack and the inlet and outlet openings, respectively.

8. A filter unit having, in combination, a cell having inlet and outlet openings, a laminated cover for the inlet opening comprising a series of diversiform expanded metal sheets, a laminated cover for the outlet opening comprising a plurality of diversiform expanded metal sheets and a plurality of wire screens, and a filtering media interposed between the covers.

In testimony whereof I have signed my name to this specification.

JAMES JARVIS PREBLE.